United States Patent [19]
Takemura et al.

[11] Patent Number: 4,712,204
[45] Date of Patent: Dec. 8, 1987

[54] OPTICAL DISK AND METHOD FOR REPRODUCING REFERENCE SIGNAL THEREFROM

[75] Inventors: Yoshinari Takemura, Osaka; Kazuaki Obara, Kadoma; Michiyoshi Nagashima, Hirakata, all of Japan

[73] Assignee: Matsushita Electric Industrial Co., Ltd., Kadoma, Japan

[21] Appl. No.: 768,843

[22] Filed: Aug. 23, 1985

[30] Foreign Application Priority Data

Aug. 31, 1984 [JP] Japan .................. 59-181752
Dec. 7, 1984 [JP] Japan .................. 59-259478

[51] Int. Cl.$^4$ .................. G11B 7/00; G11B 27/10
[52] U.S. Cl. .................. 369/32; 369/275; 369/47; 369/111; 369/54
[58] Field of Search ............ 369/275, 43, 47, 48, 369/32, 30, 111, 110, 109, 54, 58, 50, 124; 358/342, 328, 340, 336; 360/72.2, 38.1

[56] References Cited

U.S. PATENT DOCUMENTS

| 4,006,292 | 2/1977 | Schaefer | 369/111 |
| 4,015,285 | 3/1977 | Romeas | 369/111 |
| 4,142,209 | 2/1979 | Hedlund | 358/342 |
| 4,550,347 | 10/1985 | Nakamuta | 369/111 |

FOREIGN PATENT DOCUMENTS 55439 7/1982 European Pat. Off. .
59-36338 2/1984 Japan .

OTHER PUBLICATIONS

R. Imanaka et al., "Optical Disc Memory System", Proceeding of SPIE, vol. 421-09, Jun. 1983.
G. Guarracini et al., "Micromachining Video Disc Grooves and Signals, pp. 67-83, vol. 43, Mar. 1982, RCA Review.

Primary Examiner—Alan Faber
Attorney, Agent, or Firm—Cushmam, Darby & Cushman

[57] ABSTRACT

In an optical disk having grooves, pits representing reference signals in header regions of the grooves are disposed to be spaced apart from each other in a longitudinal direction of the groove to suppress undesirable interference or crosstalk of the reference signals in adjacent V-grooves. In the reproduction of such reference signals, two laser beam spots are respectively irradiated on the first and second oblique surface tracks in the V-groove. Two electric signals made by detecting the light reflected from the spots are examined to determine whether they are in coincidence. When coincidence is confirmed, the signals are used as valid reference signals.

9 Claims, 19 Drawing Figures

OPTICAL DISK AND METHOD FOR REPRODUCING REFERENCE SIGNAL THEREFROM

FIELD OF THE INVENTION AND RELATED ART STATEMENT

The present invention relates generally to optical disks and method for reproducing reference signals therefrom, and more particularly to optical recording disks having circular or helical (i.e., spiral) grooves of V-section whereon recording signals are recorded, (for example as changes of optical reflectivity or pits formed in the disk or changes of optomagnetic characteristics and reference signals are recorded by forming pits on the surface of the V-section grooves, and a method for reproducing the reference signal therefrom.

DESCRIPTION OF THE RELATED ART

In recent years, various optical disk memory means for recording and reproducing information by using laser light on a disk have been proposed. Among them, as method for improving recording density and the transfer rate in recording and reproducing, we have proposed a method for recording and a reproducing signal by utilizing an oblique surface having helical or circular grooves with V-shaped section with respect to an imaginary sectional plane in a radial direction (Japanese Patent Unexamined Published Application 59-36338).

Figure 1:
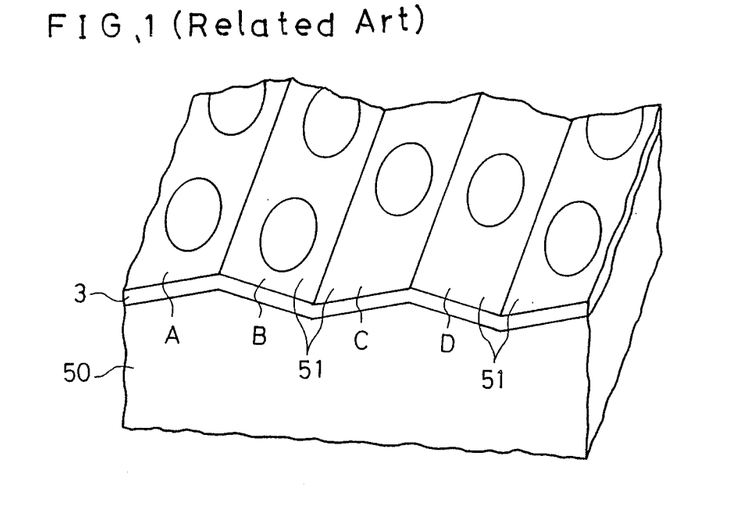
FIG. 1 is the perspective view of a small part of the optical recording disk with V-shaped cross-section grooves of the related art.
Figure 2:
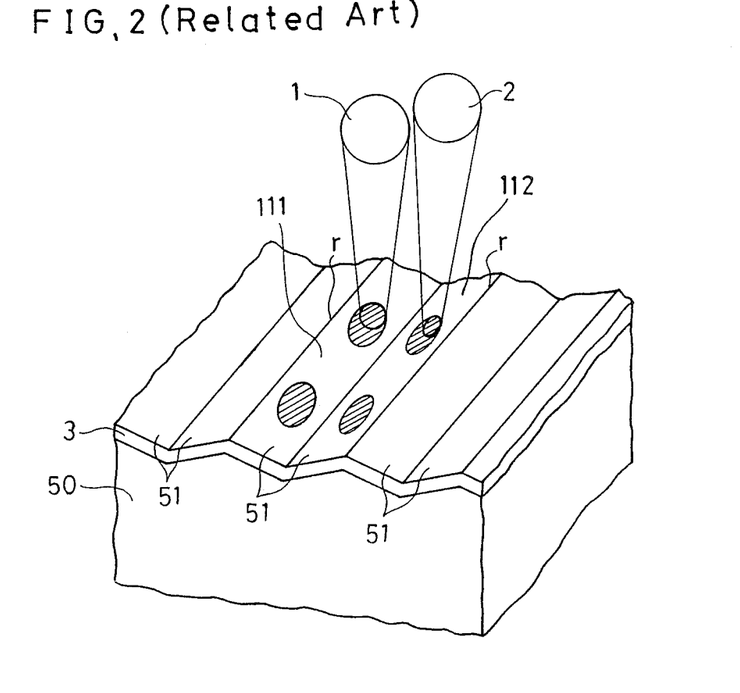
FIG. 2 is the perspective view of the small part of FIG. 1 irradiated with a pair of laser beams according to the related art.

FIG. 1 is a partially cut perspective view showing the related art proposed by the same assignee wherein the surface of the optical disk has oblique groove surfaces A, B, C, D, ... A set of laser beam spots 1 and 2, as shown in FIG. 2, are irradiated on the oblique groove surfaces of each neighboring surface (with a ridge "r" inbetween) to record information thereon and reproduce it therefrom. Alternatively, by driving the two laser beam spots 1 and 2 independently, the two tracks, e.g., oblique groove surfaces 111 and 112 may be used to record independent signals. The recording thin film 3 is, for instance $TeO_x$ ($x \approx 1.1$), and by changing reflectivity of the small areas on the track by producing a reaction with the laser beam spots, recording of the signal can be achieved.

When the signal recorded in the above-mentioned way is reproduced by scanning the disks with laser beam spots on each neighboring oblique surface of the recording groove with the similar way as in the recording, signals recorded on the two tracks are simultaneously reproduced, and such signals are usable, for instance, to obtain a transfer rate as high as twice that of the single track optical disk system. As has been described in the Published European Patent Application No. 55439, by optimumly selecting the shape of the V-section groove, crosstalk from neighboring oblique surface is suppressed by receiving mainly positive or negative first diffraction light among the reflected light from the disk and each signal from the respective tracks can be individually reproduced. In such reproducing, the photodetector to be used is known by disclosed in FIG. 6 of the Published European Patent Application No. 55439.

In general, in an optical recording disk, beside the information recording track, header regions, each with reference signals therein, are permanently recorded by the manufacturer on the disk. For instance, such reference signals are address signals for searching a selected track, a sector signal for dividing the disk into several sectors, code signals for indicating that the opitcal disk of constant angular velocity driving type or constant linear velocity driving type, or other like signals.

Figure 3:
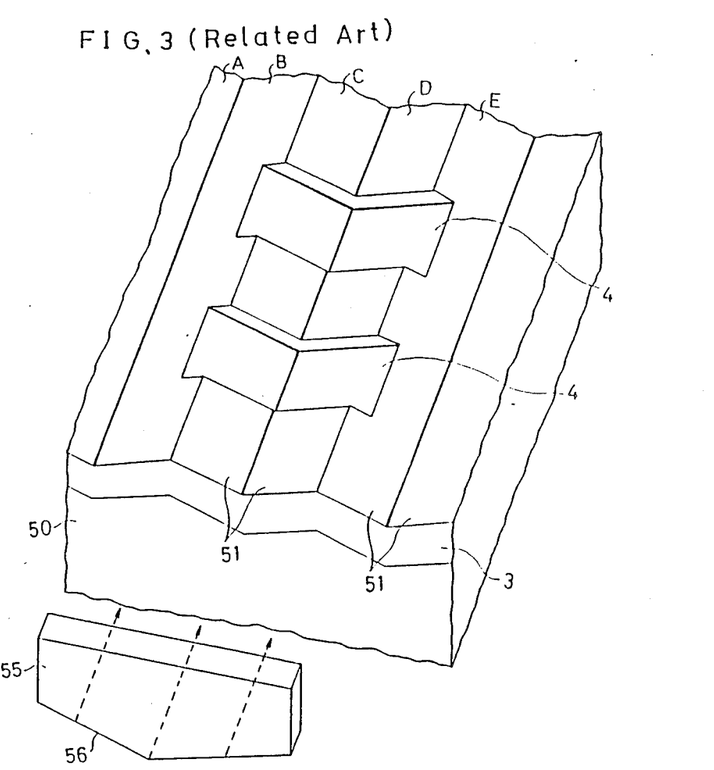
FIG. 3 is the perspectrive view of the small part of FIG. 1 having reference signal pits for permanently recording reference signal as changes of depth of V-shaped cross-section grooves according to the related art.
Figure 5:
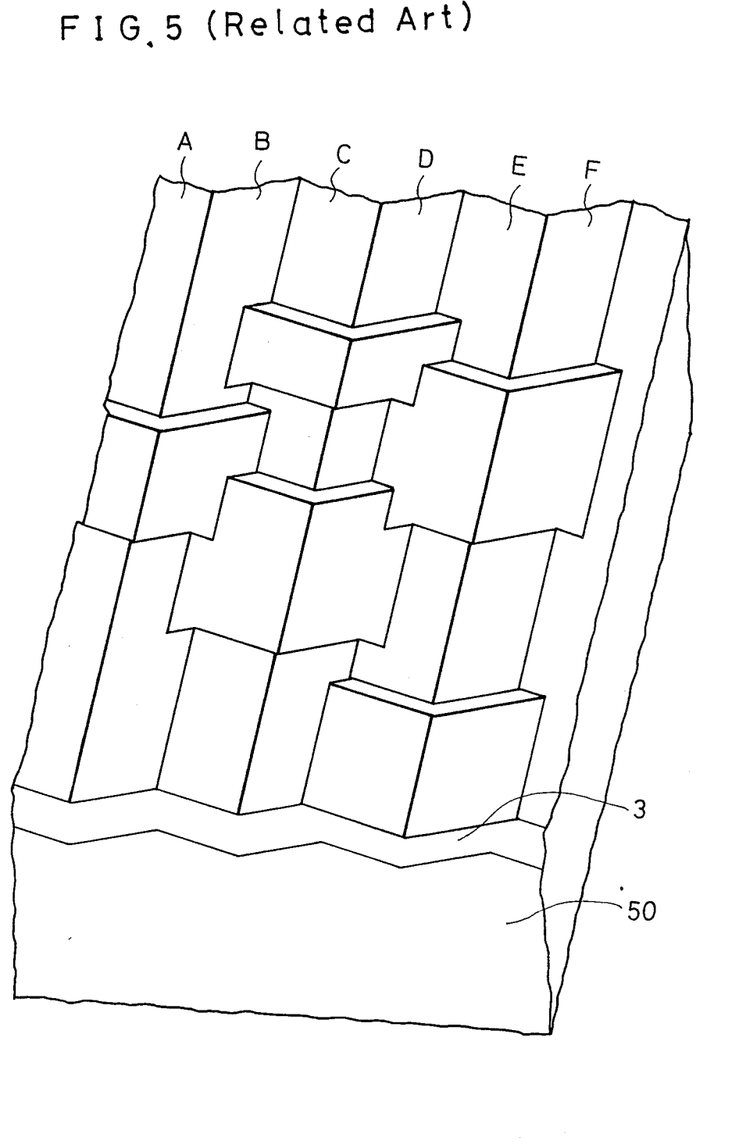
FIG. 5, consisting of A–F, is the perspective view of a small part of a recording disk according to the related art wherein pits of neighboring grooves are overlapping.

The reference signal is generally recorded, as shown in FIG. 3, by forming pits 4 on the oblique surfaces of the V-shaped track. Generally, the optical recording disk having the V-section grooves is produced by cutting the helical or circular V-section grooves 51, 51 ... on a metal master disk, by means of a diamond cutter 55 having a V-shaped cutting edge 56. And then a stamper is produced by using the metal master having the helical or circular V-shape cross section grooves. Thereafter, by utilizing the stamper, a substrate 50 is mass-produced by known plastic molding techniques or the like. The pits 4, 4 ... to be formed on the recording disk are usually produced by forming corresponding pits on the metal master surface by vibration, namely vertical motion which is in a direction perpendicuclar to the disk surface of the metal master. In the actual metal master, and hence in the recording disk, the pits 4 are formed to have round a bottom face with respect to an imaginary cross-section of the pits in a direction of the longitudinal axis of the groove. However, for the sake of easy drawing and clear understanding of the shape of the pits, the pits 4,4 ... are drawn to have rectangular shaped sections on a virtual sectional plane in the longitudinal direction of the groove as shown in FIG. 3 and subsequent drawings, FIGS. 5, 7 and 11, but actual shapes in virtual longitudinal sectional views, the pits are shaped to have rounded corners which are like sinusoidal waves or deformed sinusoidal waves.

Reproduction of reference signals by reading the pits is done by irradiating laser light beam spots on the signal tracks, namely the V-shaped groove 51, 51 having the pits 4, 4 ... thereon, and then detecting the change of diffraction light obtained from the reflection from the disk surface.

PROBLEM IN THE RELATED ART

In the above-mentioned conventional method of forming the pits for recording the reference signal, since the diamond cutter has a very large width in comparison with width of each V-shaped cross-section groove, forming of the pits on one V-shaped cross-section groove inevitably produce partial cutting of the upper edge parts of neighboring V-shaped cross-section grooves B and E, thereby undesirably producing a source of crosstalk in reproducing the signals from neighboring tracks.

Figure 4:
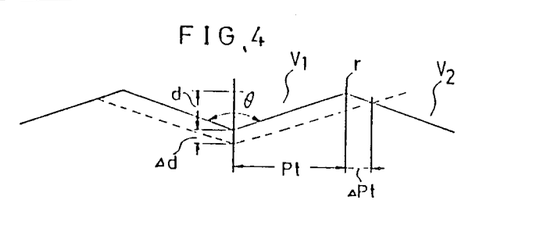
FIG. 4 is the schematic view showing the relation of width variation corresponding to depth variation of the V-shaped cross-section groove of FIG. 3.

This is shown in more in detail with reference to FIG. 4, which is a front view of the V-shaped groove wherein the angle of the V-shape of the grooves is $\theta$, the depth of the groove is "d", and the lateral pitch of the groove is 2Pt. Let us take one example wherein $$Pt = \lambda \quad (\lambda: \text{laser wavelength}) \quad (1),$$

$$d = \lambda/4n \quad (n: \text{refractive index of the substrate}) \quad (2),$$

then $$\tan\left(\frac{\theta}{2}\right) = Pt/d = 4n \quad (3)$$

is given.

Now provided that the track pitch increases by ΔPt responding to an increase of depth of the V-shaped groove by Δd, then from the above-mentioned equations the following relation is given:

$$\Delta Pt = \frac{1}{2} \Delta d \tan\left(\frac{\theta}{2}\right) \quad (4)$$

$$= 2n \cdot \Delta d.$$

In the case shown in FIG. 4, when a pit is formed in the groove $V_1$ the ridge r is shifted rightward by ΔPt, thereby broadening the width Pt of the track to Pt+ΔPt. When another pit is formed on a groove $V_2$, which is on the rightside of the former groove $V_1$, the ridge r is shifted leftward by ΔPt, thereby narrowing the width Pt of the track to Pt−ΔPt. That is, the width of the track changes from P+ΔPt to P−ΔPt, and the changes in total range 2ΔPt.

This equation gives the result that when n=1.5, the lateral increase of the pitch is three times the depth of the pits, and therefore a track pitch Pt changes by 2 Pt=6Δd. For instance, when Δd=0.02 μm, 2 ΔPt=0.12 μm results. Since the track pitch Pt is about 1 μm, such a change of the position of ridge between the tracks results in substantial crosstalk. Especially in the case of FIG. 5, wherein pits in neighboring tracks are substantially interfering with each other, there is a grave possibility of erroneous reading of the reference signal induced by the interfering dispositions of the pits in neighboring tracks.

OBJECT AND SUMMARY OF THE INVENTION

The purpose of the present invention is to provide an improved optical disk and an improved method for reproducing reference signal from the optical disk. An object of the present invention is to eliminate crosstalk between reference signals of neighboring V-shaped grooves, thereby to assure reliable reproduction of the reference signal which is very important to the operation of the optical disk.

An optical disk in sccordance with the present invention comprises:

a disk having grooves of helical or circular pattern and of V-shaped cross-section thereon, header regions on at least one of the helical and circular grooves having reference signals recorded in the form of pits that are sections of a groove having a changed depth across the width of the helical or circular groove, characterized in that the sections of the groove with the changed depth are disposed in a manner such that the sections of neighboring grooves which carry the reference signals are spaced apart from each other in the longitudinal direction of said groove.

In the method, in accordance with the present invention, for reproducing the reference signal from a recording disk which has grooves of helical or circular pattern and of V-shaped cross section thereon, each of the grooves having two recording tracks on oblique surface therein, the method comprises the steps of:

irradiating two light beams on pits carrying the reference signals in a header region on two neighboring tracks of oblique surface on helical or circular grooves of V-shaped section wherein the pits are disposed in a manner that the sections of neighboring grooves carrying the reference signals are spaced apart from each other in the longitudinal direction of the groove;

detecting reflected light from the tracks and producing two electric signals corresponding to data on respective two tracks; and detecting coincidence between the two electric signals to produce a valid reference signal only when two electric signals coincide each other.

BRIEF DESCRIPTION OF THE DRAWING

FIG. 16 is a circuit block diagram showing address interpolation circuit of the fourth embodiment in accordance with the present invention.

FIG. 17 is a schematic plan view showing a disk format of a fifth embodiment of an optical recording disk embodying the present invention.

DESCRIPTION OF THE PREFERRED EMBODIMENTS

Figure 9:
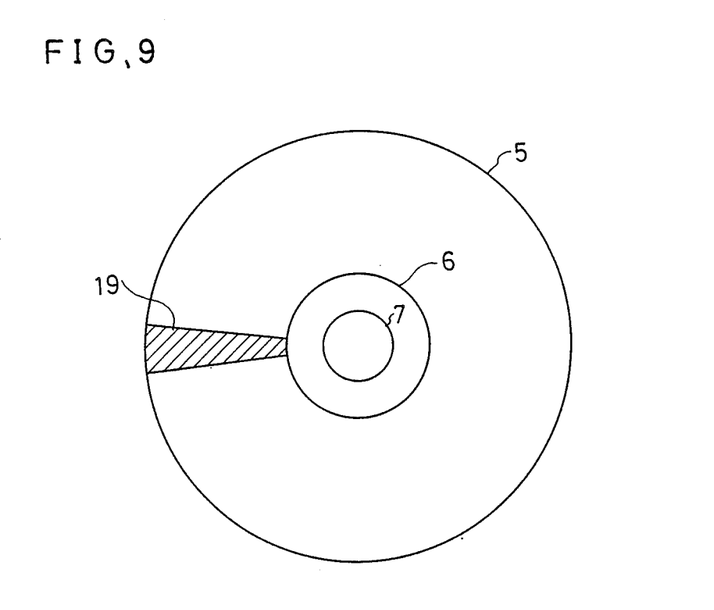
FIG. 9 is a schematic plan view showing a disk format of a second embodiment in accordance with the present invention.
Figure 10:
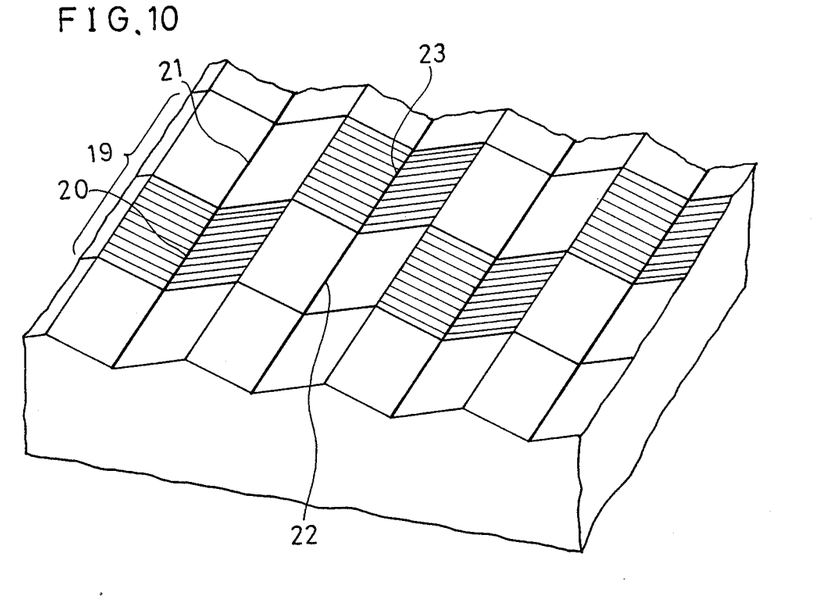
FIG. 10 is a perspective view of a small part of an optical recording disk of the second embodiment showing header regions.
Figure 11:
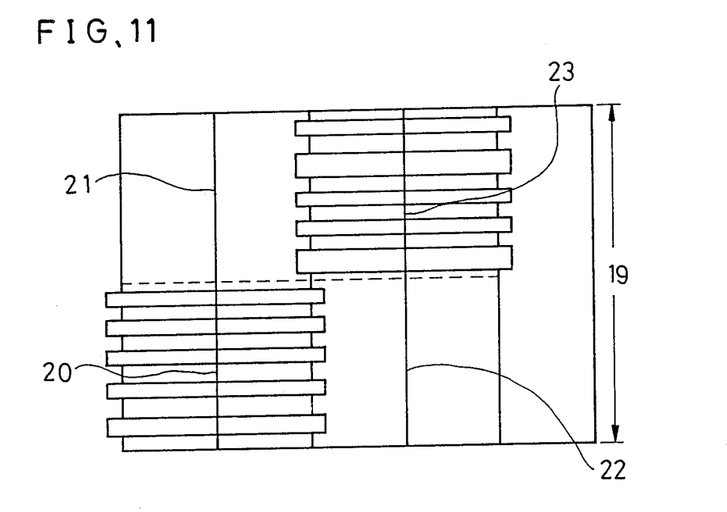
FIG. 11 is a schematic plan view of a small part of an optical recording disk showing the arrangement of the reference signal pits, wherein the vertical size of the drawing is represented very much compressed.
Figure 12:
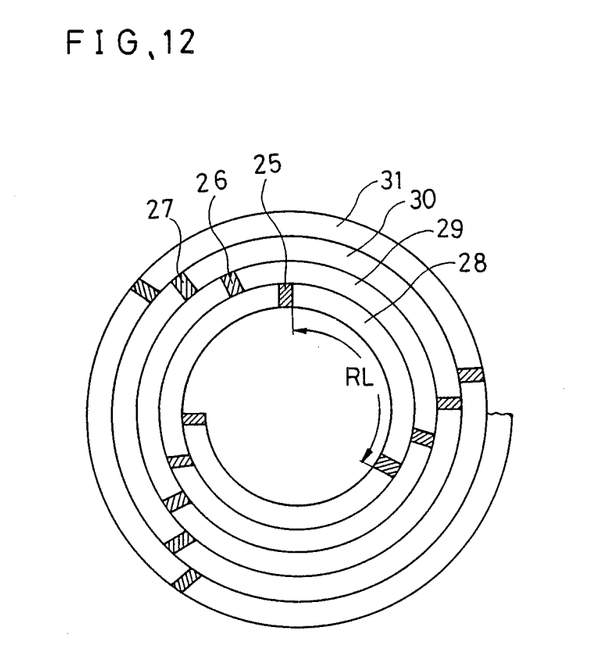
FIG. 12 is a schematic plan view showing the arrangement of reference signal pits in a third embodiment.
Figure 13:
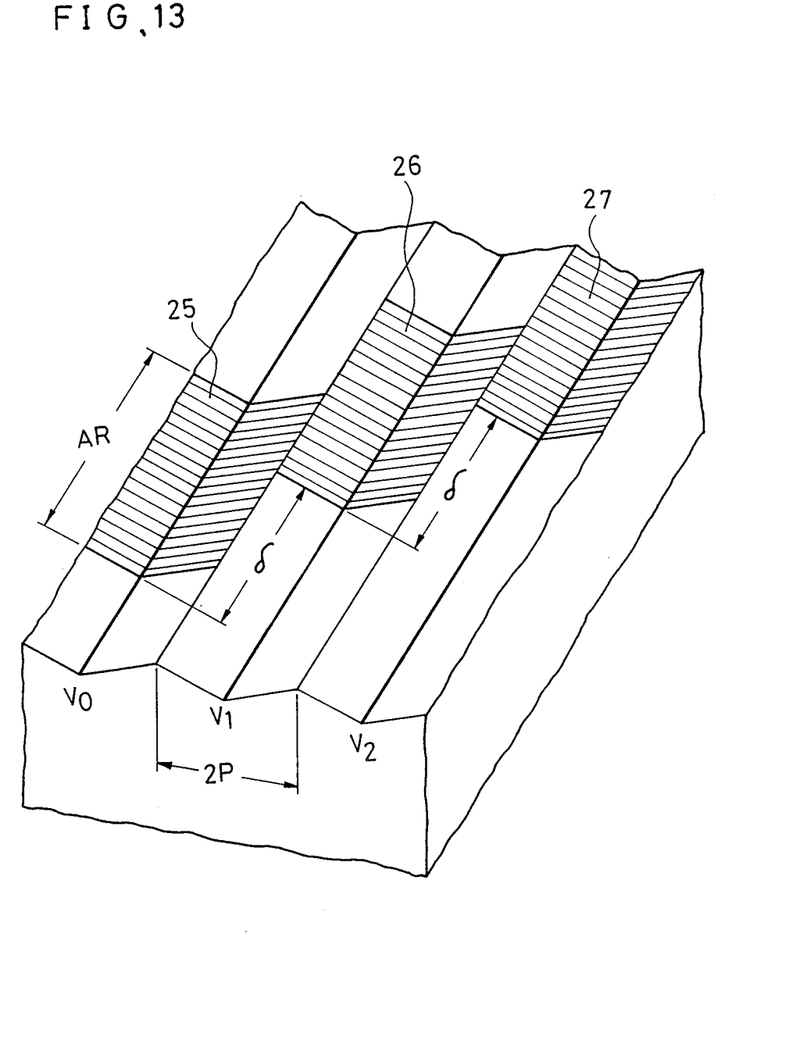
FIG. 13 is a perspective view of a small part of an optical recording disk according to the related art showing a staggered arrangement of header region on a CLV disk.
Figure 14:
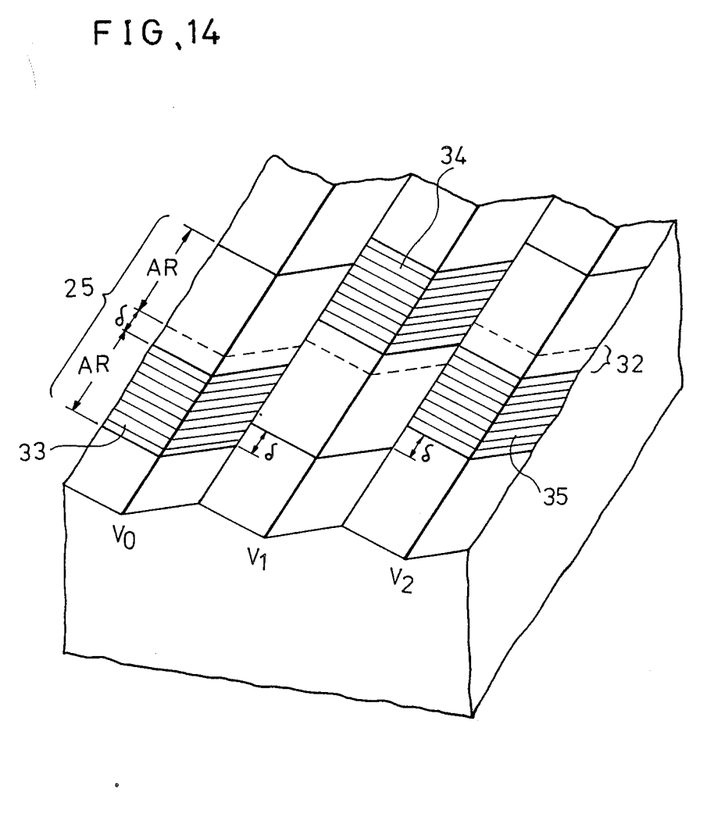
FIG. 14 is a perspective view of a small part of an optical recolrding disk of the third embodiment showing an improved arrangement of the header region embodying the present invention.
Figure 15:
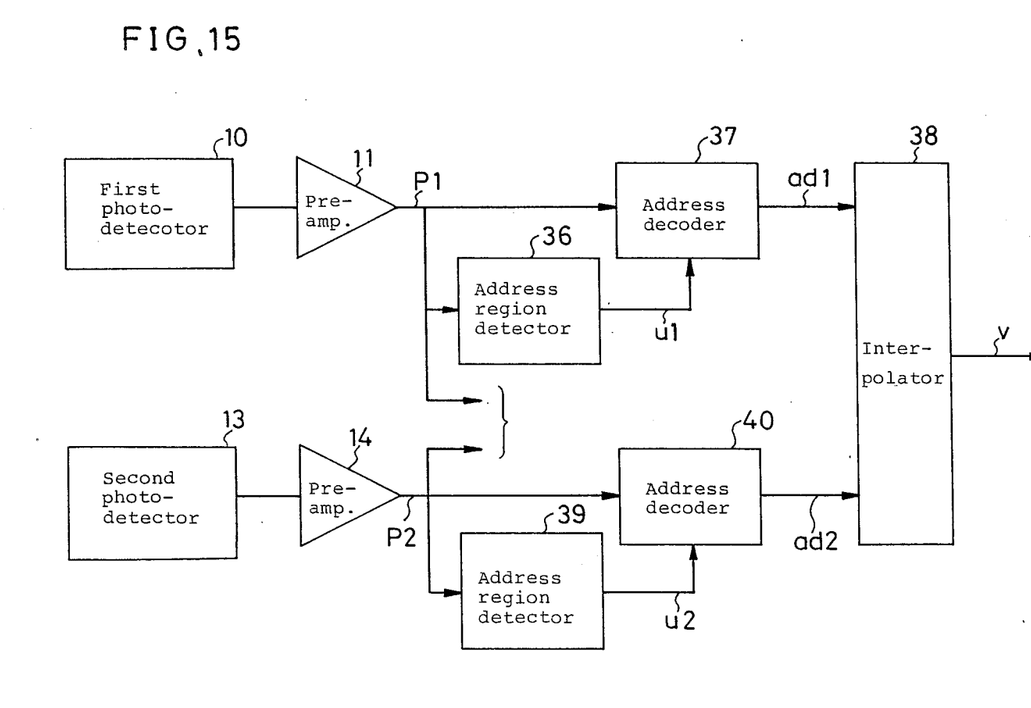
FIG. 15 is a circuit block diagram showing one example of an address reproducing circuit of a fourth embodiment.

Hereafter, the invention is described in detail taking several embodiments with reference to the accompanying drawings. FIG. 6(a), FIG. 6(b), FIG. 6(c), FIG. 7 and FIG. 8 show a first embodiment. FIG. 9, FIG. 10 and FIG. 11 show a second embodiment. FIG. 12, FIG. 13 and FIG. 14 show a third embodiment. FIG. 15 and FIG. 16 show a fourth embodiment. FIG. 17 shows a fifth embodiment.

Figure 6:
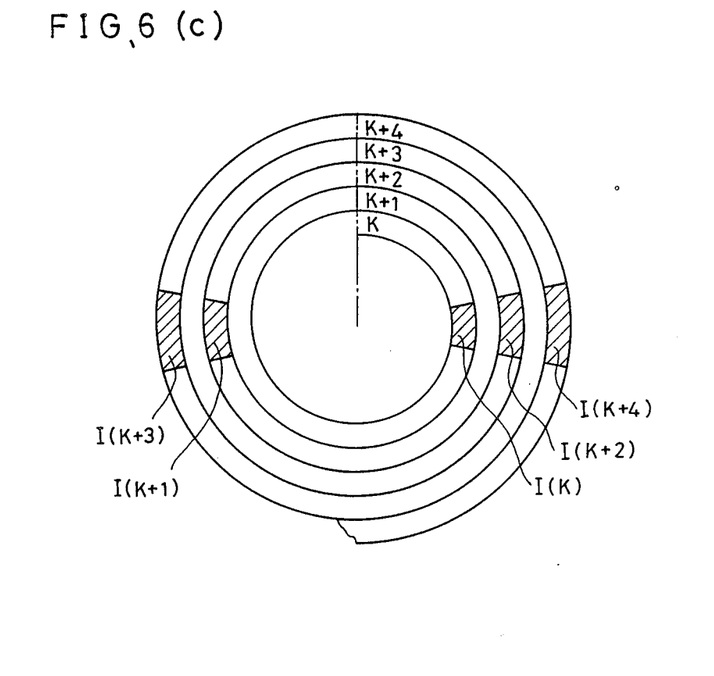
FIG. 6(a), FIG. 6(b) and FIG. 6(c) are schematic plan views of a disk format of various embodiments the present invention.
Figure 6A:
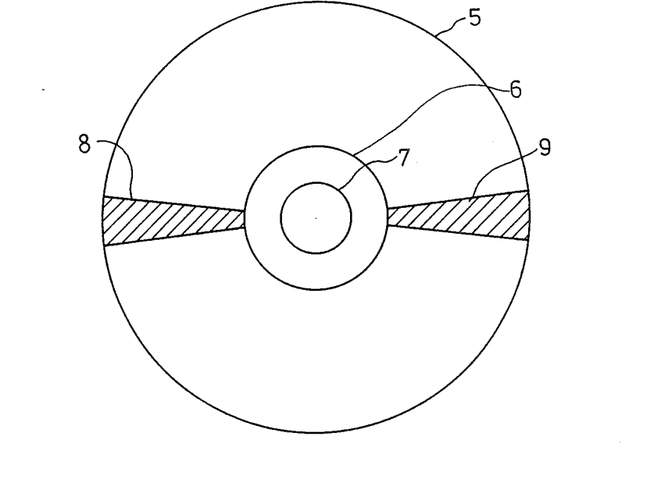
Figure 6B:
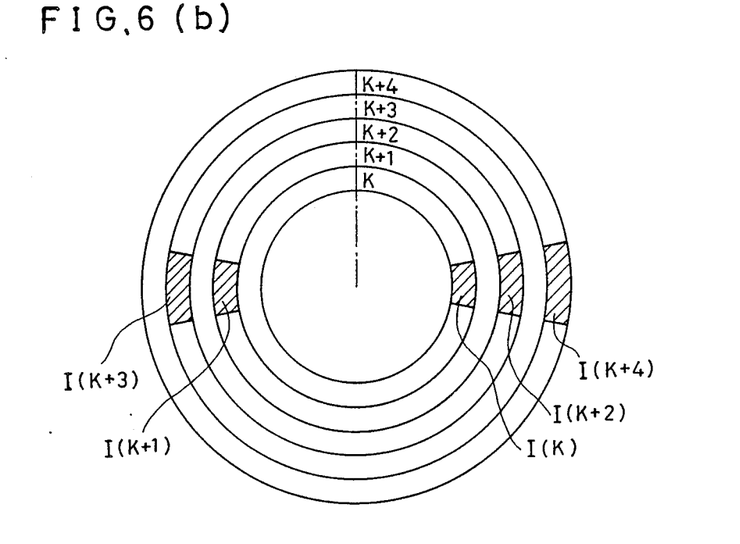

In FIG. 6(a) which shows a disk format of the first embodiment, on a disk having a center hole 7, helical or circular V-shaped cross-section grooves are formed in a region between a periphery 5 and an innermost circle 6. The optical disk further has header regions 8 and 9 in the region between the periphery 5 and the innermost circle 6. As is already known, the header regions 8 and 9 have permenently recorded reference signals, which are permanently recorded by changing the depth of the V-shaped croos-section grooves. The manner of arrangement of the header regions 8 and 9 is shown in schematical enlargement in FIG. 6(b) and FIG. 6(c) which show cases of concentric type V-grooves and helical type V-grooves, respectively. In FIG. 6(b) and FIG. 6(c), numbers K, K+1, ... K+j show K-th, K+1-th, ... and K+j-th V-groove, respectively.

Hatched regions I(K), I(K)+1, I(K)+2 ... I(K)+j show regions of reference signals for these V-grooves. In this embodiment, two header regions are provided on the optical recording disk, and in one header region, the reference signal is recorded in the V-grooves of odd number order, and in the other header region, the reference signals are recorded in the V-grooves of even number order. By arranging the reference signals in the above-mentioned manner, undesirable crosstalking of the reference signals between neighboring V-grooves can be avoided.

A method for reproducing the reference signals recorded in the above-mentioned way is described hereafter.

Figure 7:
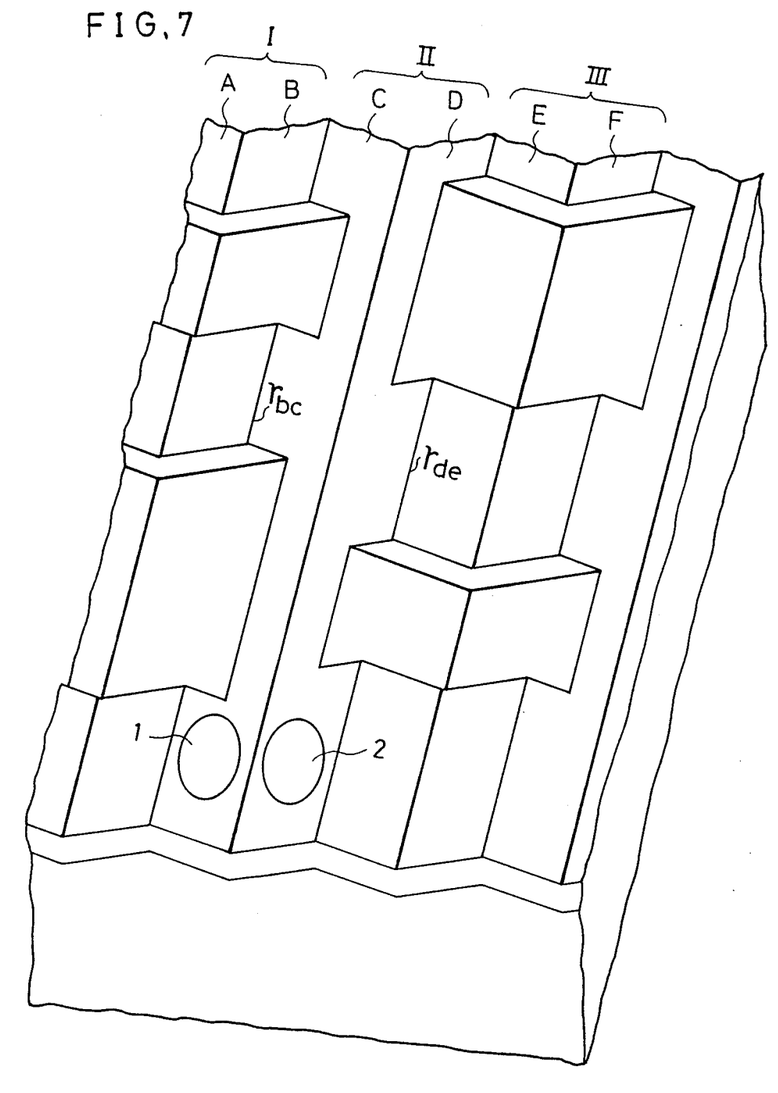
FIG. 7 is a perspective view of a small part of an optical recording disk embodying the present invention showing the relation between reference signal pits and data signal spots.

FIG. 7 shows in enlarged manner the groove portions wherein the reference signals are recorded.

In FIG. 7, in a leftest V-groove I consisting of tracks A and B and a rightest V-groove III have reference signals recorded by forming pits which are made by changing the depth of the V-groove I and III. On the contrary, in the intermediate V-groove II, no reference signal is recorded. The case when the reference signal in the leftest V-groove I is reproduced is first described. Now, provided that a laser beam spot 1 is formed on the track A and another laser beam spot 2 is formed on a neighboring track B, reflected light from the laser beam spots 1 and 2 are detected by a first photodetector 10 and a second photodetector 13, respectively shown in FIG. 8. The photodetectors 10 and 13 are configured as has been disclosed in FIG. 6 of the European Patent Application 55439, and designated therein by marks M and N. Since reflected light from the surface of the disk is diffracted by the pits on the tracks, the intensities of the reflected light beams received by the photodetectors 10 and 13 change responding to the existence or non-existence of the pits. Accordingly, by detecting the change of the intensity of the reflected light, the reference signal can be reproduced. In such detection, reference signals reproduced by the photodetector 10 and the second photodetector 13 are substantially the same. The same applies also in reproducing the reference signals recorded in the rightest V-groove III. Next, another case in which a reference signal in the intermediate V-groove II is reproduced will be described. As shown in FIG. 7, a pair of laser beam spots I and II are irradiated on the track C and track D of the intermediate V-groove II, respectively. In this case, as shown in FIG. 7, ridge line $r_{bc}$ is cut out by the pits of the V-groove I, and thereby the width of the track C is decreased at the cut out parts. As has been described with reference to the aforementioned equation (4), the width change $\Delta P_t$ of the track width $P_t$ increases responding to an increase $\Delta d$ of the pit depth "d". Accordingly, when the pit depth "d" increases to some extent, the laser beam spot 1 in the neighboring track C sufficiently detects the reference signal of the leftest V-groove. In the same manner, the laser beam spot 2 on the track D can detect the reference signal of neighboring V-groove III. In such undesirable detections of the reference signals of neighboring tracks, the first photodetector 10 and the second photodetector 13 produce different reference signals based on the V-groove I and V-groove III. Therefore, a coincidence detector 17, which produces a coincidence signal between two signals based on the first photodetector 10 and the second photodetector 13 amplified by a first preamplifier 11 and a second preamplifier 14 and decoded by a first reference signal decoder 12 and a second reference signal decoder 15, fails to issue the coincidence output. In the above-mentioned manner, by producing the coincidence detection signal between the signals based on the first photodetector 10 and the second photodetector 13 a decision is made whether the reproduced reference signal is a valid reference signal which is reproduced based on light beam scannings on a groove wherein the reference is recorded, or based on a scanning on a groove wherein the reference signal is not recorded.

Figure 8:
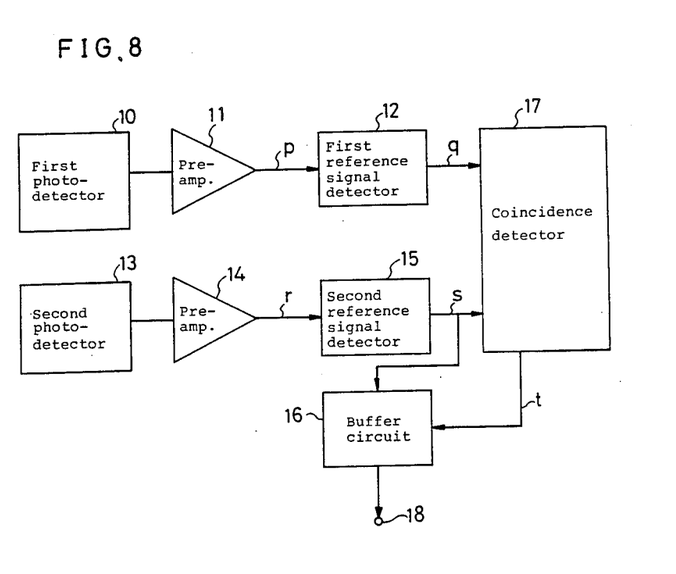
FIG. 8 is a circuit block diagram of one example of a reference signal reproducing circuit in one embodiment of the present invention.

FIG. 8 is a block diagram showing an example of a circuit for reproducing the reference signal, wherein output terminals of the first photodetector and the second photodetector are connected through a preamplifier 11 and a preamplifier 14 to input terminals of a first reference signal decoder 12 and a second reference signal decoder 15, respectively. And output terminals of the first reference signal decoder 12 and the second reference signal decoder 15 are connected to input terminals of a coincidence detector 17. As has been described with reference to FIG. 7, the first photodetector 10 and the second photodetector 13 detect reflection light from the laser beam spots 1' and 2', and their output signals are amplified by the preamplifiers 11 and 14, to produce reproduced signal "p" and "r". The first reference signal decoder 12 and the second reference signal decoder 15 decode the reproduced reference signals "p" and "r" thereby to produce the reference signals "q" and "s", respectively. A buffer circuit 16 stores the output signal "s" from the second reference signal decoder 15, and when the coincidence detector 17 issues an output which indicates the reference signal "q" and "s" are identical to each other thereby issuing a coincidence signal "a", then the temporarily stored signal "s" is issued to its output terminal 18. As a result of the above-mentioned circuit configuration and signal processing, two reference signals obtained by the pair of laser light beams scanning on neighboring tracks are examined with respect to their coincidence, and when the coincidence is confirmed the reference signal is outputted as a valid reference signal.

In general, in the reference signal, much information is contained, among which the signal with the largest information is the address signal. The address signal comprises a coded signal of address value to show each V-groove, an address mark signal to show the starting points of the address regions, error an correction code for detecting and correcting errors generated by the production of the code signal, a clock synchronization signal, and other like signals.

The address signal is preferably recorded for every certain data length of a recorded signal. However, for instance, in the case of FIG. 6(c), the distance between the reference signal I(K) and I(K+1) is one and half turns, while a distance between I(K+1) and I(K+2) is only half a turn. Therefore, the length of the data recording region is not uniformed with respect to each groove. In order to improve the above-mentioned problem, a modified disk format as shown in FIG. 9 is proposed. In the optical recording disk shown in FIG. 9, the header region 19 disposed in a region including one radius has a recording of a reference signal including the address signal. The optical recording disk shown in FIG. 9 is for use in constant angular velocity driving (hereinafter is referred to as CAV driving). In the case where signal recording and reproducing are made by the CAV driving, the header region is disposed on a radius as shown in FIG. 9.

FIG. 10 is an enlarged perspective view showing a small portion of the disk surface whereon the header region disposed on the radius is shown. When the bit number of the address signal is L, the header region 19 has a physical length for enabling the cutting of the disk for an information capacity of 2L bits. In the example of FIG. 10, the header region 19 is divided into several sets each consisting of two parts 20 vs. 21, two parts of 22 vs. 23, etc., and the regions of the address signal are disposed like in a checker pattern as shown in FIG. 10. That is, the header regions are disposed with respect to a radius line in alternate V-grooves in the radial direction, so that pits of neighboring V-grooves do not conflict with each other. FIG. 11 is a plan view showing a small portion of the header region formed in the above-mentioned manner.

A third example is described hereafter with reference to FIG. 12, FIG. 13 and FIG. 14. This third embodiment relates to an optical recording disk of constant linear velocity type (hereinafter is abbreviated as CLV-type). In FIG. 12, the hatched regions show header regions and 28, 29, 30 and 31 show V-grooves provided such that a unitary length of data length of the recording signal is 1 bytes, and the physical length of the V-groove necessary for recording it is always the same irrespective of the position of the grooves being near the periphery or near the center. Now let us define this unit length to be RL and that the length RL includes the address of the signal. In this type of optical recording disk, though the header regions are not disposed simply on one radius of the recording disk, still there are possibilities such that the neighboring header regions are disposed next to each other contacting fully or partly in the radial direction. FIG. 13 shows a small portion of the optical recording disk wherein three neighboring header regions in neighboring V-grooves $V_0$, $V_1$ and $V_2$. Now, provided that the radial distance (pitch) of the neighboring V-grooves is 2P, the distance difference $\delta$ along the helical or circular V-groove between the observed V-groove $V_1$ and adjacent outer V-groove $V_2$ or adjacent inner V-groove $V_0$ is about $2\pi \cdot 2P$. When 2P is 1.6 $\mu$m, the distance difference $\delta$ is $\delta \approx 10$ $\mu$m. When the length of the recording portion of the address signal AR is longer than the discance $\delta$, the neighboring header regions become partly contacting in the radial direction as shown in FIG. 13, and therefore due to the aforementioned reason in the preceding example, a reading of the address signal becomes difficult. In order to dissolve the above-mentioned problem, as shown in FIG. 14 the lengths of the header regions are selected to be twice the physical length necessary for cutting the address signal thereon plus $\delta$, that is $2AR + \delta$, and that the header region is divided into two parts, i.e., a central part 32 having no address signal and one end region having address signals. By so arranging the header regions, the forming of the address signals is made by selecting one half part, another half part, one half part, etc. . . . in the address cutting regions of the header regions 25 so that the address signal parts 33, 34, 35 . . . are not formed radially continuous.

The address signals recorded by the above-mentioned CAV type or CLV type optical recording disk can be reproduced in a similar way as that described with reference to the circuit of FIG. 8.

In general, the address value of the optical recording disk is recorded by regularly changing at every predetermined data length. Therefore, even though all the addresses are not recorded, address values can be reproduced by interpolating from the address values of previous or subsequent positions. As an example, a description will be given of a case wherein address values are alloted in sequential order on a row of V-grooves on the optical recording disk, and the address signal is recorded in every other V-grooves. In this case, in the configuration of the optical recording disk shown in FIG. 7, when the address value of the V-groove 1 is address n (n is an integer), and the address value of the V-groove 3 is n+2, in the same manner the address values are designed to increase by 2 for every two-groove displacement of the V-groove. This type of recording is a recording type wherein among two header regions 8 and 9 of FIG. 6(a), only one is used for recording, and in this type of recording there is no possibility that two address signals in the neighboring V-grooves conflict with each other. And hence, this type recording produces no cross talk.

Next, a method of reproducing the address signals recorded in the above-mentioned way will be described. When the address signals are recorded on the V-grooves I and III as shown in FIG. 7, address signals are reproduced by using a pair of laser beam spots which coincide with each other. And therefore it is determined that the reproduced address signal is right one which is the recorded on tracks which are in the same V-groove. On the contrary, when reproducing the signal is carried out on the V-groove II wherein no address signals are recorded, a pair of laser beam spots reproduce the address signals of neighboring V-grooves I and III by detecting cross talk noises due to the tresspassing edges of the pits beyond the ridges between the different V-grooves. Address values of the V-groove II are obtainable by an interpolation using the address values of the V-groove I and the V-groove III.

FIG. 15 is a circuit block diagram showing one example of a circuit for reproducing the address signal of this fourth example. In the circuit block diagram of FIG. 15, corresponding components and parts with the previous example of FIG. 8 are shown by the same numerals. The circuit of this example comprises address region detectors 36 and 39, address decoders 37 and 40 and an interpolator 38 which issues output signal to an output terminal 41. Similar to the circuit of FIG. 8, the first photodetector 10 and the second photodetector 13 detect reflected light of the laser beam spots 1 and 2, respectively. The first and second photodetectors 10 and 13 issue electric signals to the preamplifiers 11 and 14, thereby issuing output signals P1 and P2. The address region detector 36 and 39 detect address mark signals from the output signals P1 and P2, respectively, thereby issuing address gate signals u1 and u2, which are given to the address decorder 37 and 40, respectively. These address decoders 37 and 40 issue output address values ad1 and ad2 to the interpolator 38. The interpolator 38 examines whether the first address value ad1 and the second address value ad2 coincide each other. Then, when coincidence is obtained, the interpolator 38 issues the address value to the output terminal 41 as an address value v of the V-groove II being scanned by the pair of the laser beams 1 and 2. On the contrary, when coincidence is not obtained, the address value v of the V-groove is produced by the predetermined interpolation process using two address values ad1 and ad2, and such interpolated output v is issued to the output terminal 41.

Incidentaly, in the circuit of FIG. 15 the reproduced signals P1 and P2 are further used to reproduce data signals other than the address signal reproducing, and therefore is given to a known signal reproducing circuit (not shown in FIG. 15).

Next, the process of interpolation of the address value is described. The interpolation process is dependent on the recording method of address values on the optical recording disk. Now in this example, let us provide that the address signal is recorded in the track of every other V-groove.

One example of the interpolation circuit is shown in FIG. 16. The circuit of FIG. 16 has two address decoders 37 and 40 which give output signals to an interpolator 38. The components and parts corresponding to those of FIG. 15 are designated by the same numerals. The interpolator 38 has an adder 42 and a divider 43 connected in sequence. As has been described on FIG. 15, the address decoders 37 and 40 reproduce output signals ad1 and ad2 respectively. The adder 42 adds the address values ad1 and ad2. The divider 43 divides the added value by 2, and outputs the divided value to the output terminal 41 as the address value v. In general, such computation is made by binary code, and therefore the dividing by the divider 43 is made by only shifting the added result by one bit toward the LSB. When the address signal of the V-groove I of FIG. 7 is reproduced by this interpolation ciricuit of FIG. 16, both address alues ad1 and ad2 become n. Accordingly, the address value v after the interpolation processing is also n. When the address value in the V-groove III is reproduced, the address value v becomes n+2 in a similar way.

Next, when the address value on the V-groove II is reproduced, the address value ad1 becomes address n, and the address value ad2 becomes n+2. Therefore by obtaining the arithmetic mean of these two address values, the address value v of the V-groove II is determined to be n+1.

The recording method of the address value varies depending on the format of the optical recording disk. FIG. 17 shows another example of the optical disk format wherein the corresponding parts are designated by the same numerals with the preceding examples, for instance FIG. 9. The optical recording disk of FIG. 17 is divided into k sectors. In the example k is 8. For the sake of recording and reproducing the data signal and serching for it, it is convenient to control the data signal on a sector by sector basis. Accordingly, the address is alloted for respective sectors. In this case, address values of plural V-grooves which are adjoining within one sector separated by the sector separators vary by addresses of K. In this case, by recording the address signals in a manner to advance by an address of 2k, for instance, address n+2k after address n and the like. Then, by the interpolator circuit shown in FIG. 16, the address values of respective V-grooves are obtainable in the same way.

When the series of address values are not in the above-mentioned arithmetical series, the above-mentioned interpolator circuit can not be used. In general, the interpolator 38 can comprise a ROM, and predetermined address values are preliminarily written in the ROM. When the address signal is to be reproduced, it is done by reading out the written data by means of the address values ad1 and ad2 as the addresses of the ROM, and the read out address value v is used as the address of the V-groove which is looked for.

As has been described in detail on preferred embodiments, the apparatus and method in accordance with the present invention can record and readout reference signals without any trouble of interference between neighboring V-grooves, and very accurate reading is achievable by using coincidence of the reference signals read by two laser beam spots. Besides, in the case of recording the address signals in every other V-groove, by utilizing crosstalk of the address signals in neighboring V-grooves, address signals of the V-grooves having no recording of the address signal can be obtained by means of interpolation. Accordingly, practical utility of using the above-mentioned method of recording on an optical recording disk as well as the method of reproducing the reference signal, the optical recording is very occurate.

What is claimed is:

1. An optical disk comprising:
    a disk having grooves of helical or circular pattern thereon, each groove having a V-shaped cross-section,
    a plurality of header regions on said grooves, each header region having a reference signal recorded in a groove in the form of a changed depth portion across a width of said groove;
    said changed depth portions being disposed so that changed depth portions of adjacent grooves are spaced apart from each other in a longitudinal direction of the grooves.

2. An optical disk in accordance with claim 1 wherein each header region is at least twice as long in said longitudinal direction as is necessary for recording one reference signal, said each region being divided into a leading region and a following region, adjacent header regions having reference signals recorded in such a staggered manner that recording in adjacent grooves alternates between said leading region and said following region.

3. An optical disk in accordance with claim 2, wherein each of said header regions has a length at least twice as long as necessary for recording one reference signal plus a length $2\pi$ times a width of one of said grooves, where said disk is of the constant linear velocity type.

4. An optical disk in accordance with claim 1, wherein reference signals are recorded in alternate grooves.

5. An optical disk in accordance with claim 1, wherein said reference signals include address values recorded in an even number.

6. An optical disk in accordance with claim 1, wherein said reference signals include address values recorded in an odd number.

7. A method for reproducing reference signal from a recording disk which has grooves of helical or circular pattern thereon, each groove having a V-shaped cross section and first and second recording tracks on first and second oblique surfaces of the V-shape, a plurality of header regions being disposed on siad grooves, each header region including a reference signal recorded in a groove in the form of a changed depth portion across said first and second oblique surface tracks of said groove, the method comprising the steps of:

respectively irradiating first and second light beams on said first and second tracks in a header region of one groove detecting light reflected from said first and second tracks and respectively producing first and second electric signals when said changed depth portion in said first and second tracks is detected; and detecting coincidence between said first and second electric signals and producing a valid reference signal only when said first and second electric signals coincide.

8. A method in accordance with claim 7, wherein said irradiating step includes the step of irradiating the first and second tracks of one groove while partially irradiating the changed depth portions of reference signals carried in the two grooves adjacent said one groove, and wherein said detecting step includes the step of detecting light reflected from said two adjacent grooves and producing two address values corresponding to the changed depth portions of two said adjacent grooves, and further including the step of producing an address value for said one groove by carrying out an interpolation of said two address values.

9. A method in accordance with claim 8, wherein said of two said producing step includes the step of adding said two address values together to produce a sum and then dividing said sum by 2 to produce an address value of said one groove.

* * * * *